United States Patent [19]
Kowalics

[11] Patent Number: 5,449,144
[45] Date of Patent: Sep. 12, 1995

[54] FAUCET VALVE WITH SAFETY HANDLE

[75] Inventor: Raymond P. Kowalics, Solon, Ohio

[73] Assignee: The Meyer Company, Cleveland, Ohio

[21] Appl. No.: 306,029

[22] Filed: Sep. 14, 1994

[51] Int. Cl.6 .............. F16K 35/02; F16K 31/52; F16K 7/16
[52] U.S. Cl. .................. 251/99; 251/104; 251/109; 251/110; 251/246; 251/263; 251/322; 251/323; 251/331
[58] Field of Search ............ 251/89, 95, 98, 99, 251/103, 104, 107, 109, 110, 242, 243, 244, 245, 246, 251, 263, 320, 321, 322, 323, 331, 335.2

[56] References Cited

U.S. PATENT DOCUMENTS

| | | | |
|---|---|---|---|
| 10,800 | 4/1854 | Bouton | 251/238 |
| 1,024,094 | 4/1912 | Mueller. | |
| 1,369,877 | 3/1921 | Beck | 251/251 |
| 1,938,292 | 12/1933 | Koppelman | 251/239 |
| 3,207,472 | 9/1965 | Seltsam | 251/331 |
| 3,301,525 | 1/1967 | Chernak et al. | 251/331 |
| 3,426,798 | 2/1969 | Chernak | 251/331 |
| 3,459,345 | 8/1969 | Chernak et al. | 251/331 |
| 3,904,174 | 9/1975 | Giese | 251/331 |
| 4,109,673 | 8/1978 | Horowitz et al. | 251/99 |
| 4,770,388 | 9/1988 | Carman | 251/110 |
| 4,854,544 | 8/1989 | Blase et al. | 251/322 |
| 5,014,528 | 5/1991 | Roberts | 251/110 |
| 5,183,073 | 2/1993 | Roberts | 251/110 |

Primary Examiner—George L. Walton
Attorney, Agent, or Firm—Fay, Sharpe, Beall, Fagan, Minnich & McKee

[57] ABSTRACT

A faucet for controlling the dispensing of liquids includes a valve body having a valve chamber with a valve element movable between first and second positions for controlling flow between an inlet and the outlet. An operating stem extends from the valve element to a position exteriorly of the body through a bonnet connected to the body. A safety-type cam actuator is joined to the stem and is pivotally movable to selectively move the valve element between the first and second positions if it is first moved inward radially of the stem. Wall forming portions extending outwardly from an insert located between the bonnet and the body to define guide surfaces closely adjacent the stem and the cam actuator to prevent undesired tilting of the stem and the cam actuator.

11 Claims, 2 Drawing Sheets

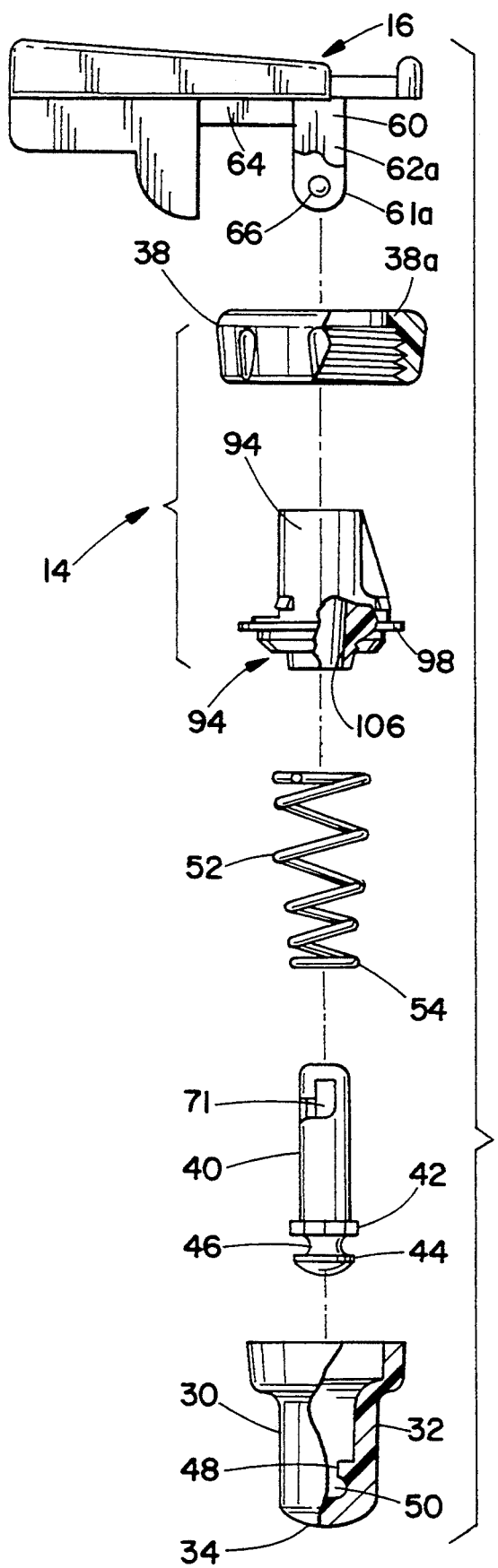
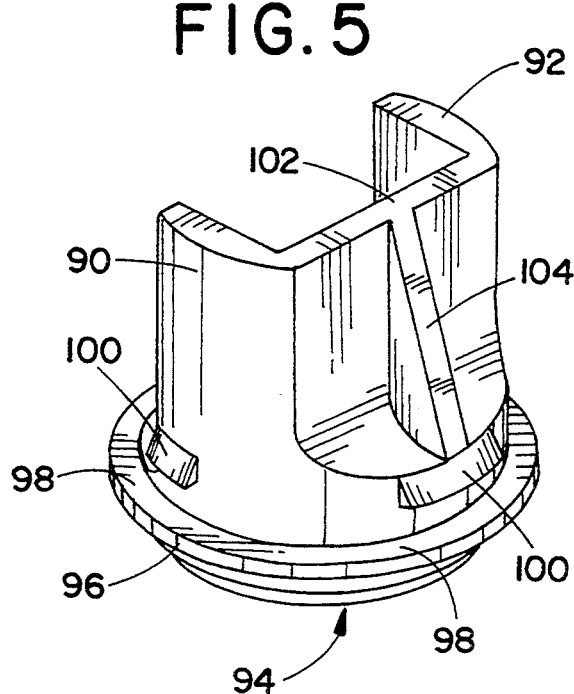

FAUCET VALVE WITH SAFETY HANDLE

BACKGROUND OF THE INVENTION

The subject invention is directed toward a dispensing valve and, more particularly, to such a valve having an improved operating handle arrangement.

The invention is especially suited for use in valves intended for dispensing hot fluids and will be described with reference thereto; however, valves of the invention can be used in many environments for controlling all types of fluids.

A common and well known type of dispensing valve or faucet used for controlling the dispensing of fluids such as coffee and other beverages comprises a faucet body having a downwardly directed outlet controlled by an internal valve joined to an upwardly extending stem. The stem extends out of the body through a bonnet and movement of the stem is controlled by a manually operated cam actuator pivotally joined to the stem and acting against the bonnet.

A problem sometimes encountered with this general class of valves is the possibility of undesired discharge of fluid caused by advertent bumping of the actuator. The seriousness of such inadvertent opening depends, of course, on the nature of the fluid and the surrounding environment. Although different types of safety latches have been proposed to prevent such opening, the problem has persisted and a need exists for an improved actuator arrangement.

SUMMARY OF THE INVENTION

The subject invention provides an improved faucet assembly for controlling the dispensing of liquids and includes a valve body having a valve chamber with an inlet and an outlet and a valve element positioned in the chamber and movable between first and second positions for controlling flow between the inlet and the outlet. An operating stem extends from the valve element to a position exteriorally of the body through a bonnet which is connected to the body. A cam actuator is joined to the stem and is pivotally movable about a pivot axis that is perpendicular to the axis of the stem. The cam actuator serves to actuate the stem to selectively move the valve between the first and second positions. Wall forming portions extend outwardly of the bonnet and define guide surfaces closely adjacent the stem and the cam actuator in planes perpendicular to the pivot axis. This arrangement is such that bumping or inadvertent forcing of the actuator or stem in directions parallel to the plane defined by the axis of the stem and the axis of the pivot to the pivot axis of the cam is prevented so that inadvertent opening of the valve element cannot take place because of forces exerted in those directions. The presence of the wall forming portions acts to substantially reduce or eliminate such undesired tilting of the stem.

Preferably, and in accordance with a more limited aspect of the invention, the wall forming portions are used in conjunction with a cam actuator that is movable between and operative and an inoperative position with biasing means to maintain it normally biased to the inoperative position. The cam actuator is arranged such that it must be moved in a direction perpendicular of the pivot axis to move the cam actuator to a location where it can provide an opening movement of the stem. This requires a predetermined movement of the cam actuator in a direction perpendicular to the stem. Thus, inadvertent bumping or impact with the faucet and the actuator cannot cause opening of the valve unless the cam actuator is manually moved transverse to the axis of the stem and then tilted precisely in a plane perpendicular to the pivot axis between the guide walls.

Desirably, the wall portions are forming on an insert member separate from the bonnet and captured between the bonnet and the body. The use of the separate insert member thus permits ready adjustment of the direction the cam actuator extends from the valve body. Further, it permits the bonnet to be threadedly connected to the body so that the direction of orientation of the cam actuator is not influenced by the manner in which the bonnet is joined to the body since the insert is movable relative to the bonnet and the body.

As can be seen from the foregoing, a primary object of the invention is the provision of a dispensing faucet assembly of the general type described wherein the stem and cam actuator are closely constrained to prevent inadvertent cracking or opening of the valve.

A further object of the invention is the provision of a faucet type dispensing valve of the type described wherein the actuator is constrained against undesired tilting.

A further object is the provision of a valve of the type described wherein a safety type cam actuator can be used and is guided throughout its movement by wall portions formed to extend outwardly beyond the bonnet adjacent the stem and the safety cam actuator.

A further object of the invention is the provision of an assembly of the general type under consideration wherein the desired guide means can be selectively installed on existing faucet bodies without modification thereof.

BRIEF DESCRIPTION OF THE DRAWINGS

The above and other objects and advantages will become apparent from the following description when read in conjunction with the accompanying drawings wherein:

FIG. 4 is an exploded view, partially in section, showing the valve element and operating stem together with the cam actuator and bonnet elements; and, FIG. 5 is a perspective view of one of the insert elements used in the preferred embodiment.

DETAILED DESCRIPTION OF THE PREFERRED EMBODIMENT

Figure 1:
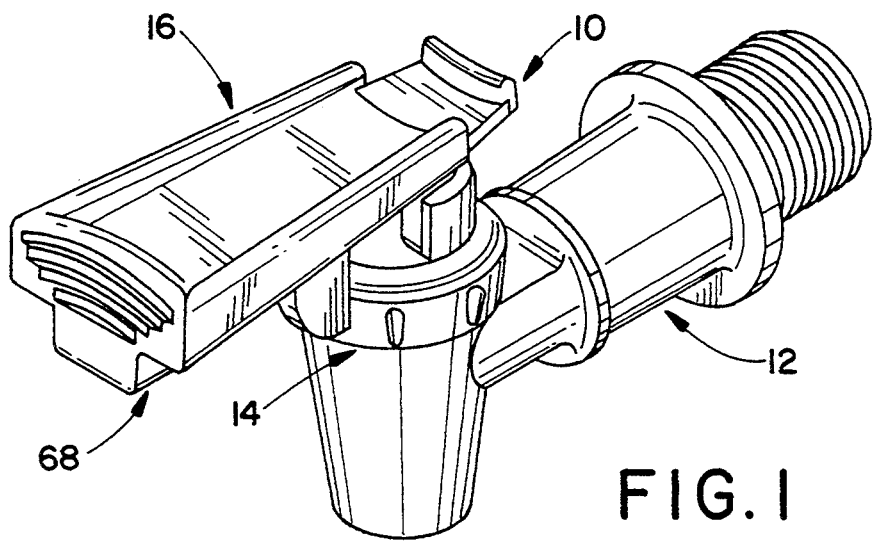
FIG. 1 is a perspective view of a dispensing type faucet valve embodying a preferred form of the invention.
Figure 2:
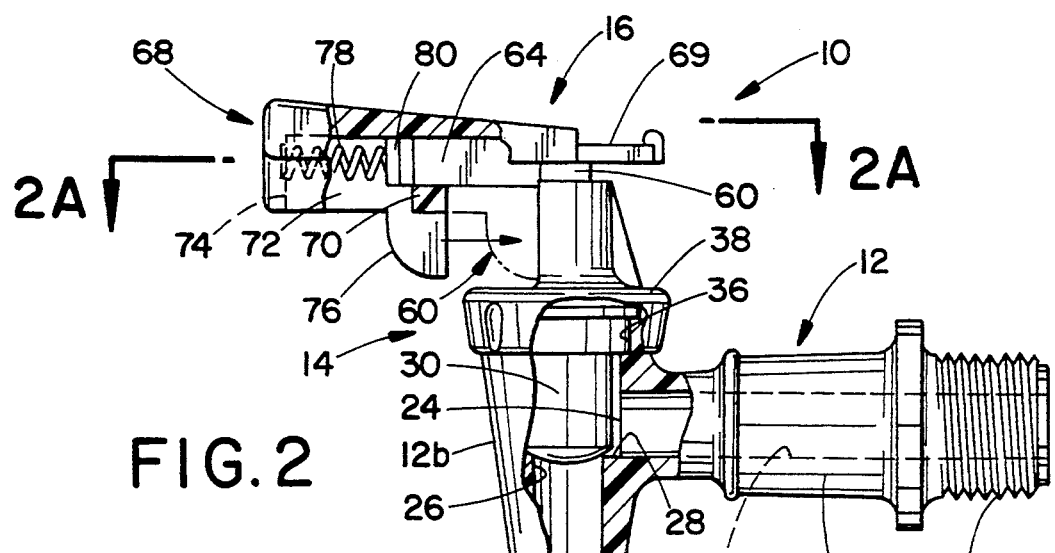
FIG. 2 is a side elevational view of the faucet shown in FIG. 1 (portions have been broken away to more clearly show certain features of interior construction)
Figures 2A, 3:
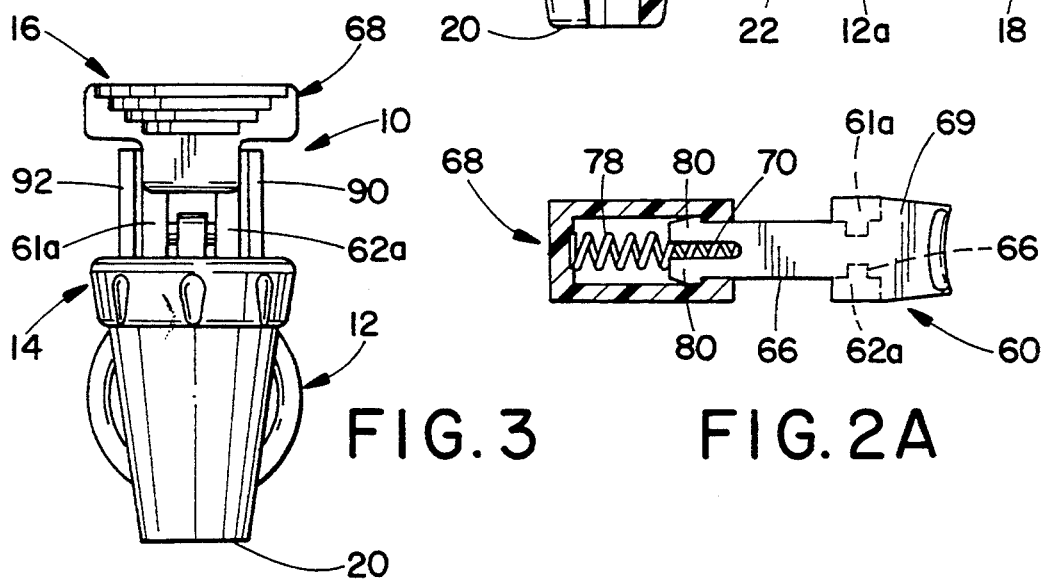
FIG. 2a is a cross-sectional view taken on lines 2a—2a of FIG. 2.
FIG. 3 is a front elevational view of the faucet of FIG. 1.

Referring more particularly to the drawings wherein the showings are for the purpose of illustrating a preferred embodiment of the invention only and not for the purpose of limiting same, FIGS. 1 through 3 best shown the general overall arrangement of a dispensing type valve or faucet assembly 10 that generally includes a main body 12 that carries a valve element and bonnet arrangement 14. A suitable manually operable cam actuator assembly 16 is arranged for providing selective opening of the valve element.

The body 12 is of a relatively standard, well known design and configuration. Generally, as illustrated, the body 12 is formed of a metal or suitable plastic or resinous material and has an inlet end 18 and a nozzle or outlet end 20. The horizontal portion 12a of the body 12 defines the inlet passage 22 which joins with a cylindrical valve chamber 24 that extends vertically in body section 12b. Chamber 24 has an outlet 26 that is generally in alignment with the axis of the valve chamber 24 and provides an outlet passage to the outlet end 20. It will be noted that the annular shoulder at the juncture between valve chamber 24 and the outlet passage 26 generally provides a seat 28 of flat, annular configuration.

Positioned within the valve chamber 24 and arranged to cooperate with the seat 28 to control flow from the valve chamber to the outlet passage 26 is a relatively standard valve element 30 (see FIG. 4) which has a generally cup-like shape and is preferably molded from silicon rubber or some suitable elastomer capable of withstanding the operating conditions to which it is to be subjected in the subject faucet. As illustrated, the cup-like valve element 30 has a lower cylindrical end portion 32 which is of smaller diameter than the interior of the valve chamber and terminates in a closed end wall 34. End wall 34 is sized and arranged so that it can engage about the seat 28 when it is driven downwardly to the position shown in FIG. 2. The upper end of the valve element 30 extends radially outward as shown and is sized so as to be tightly received in the larger diameter counterbore section 36 formed about the upper end of valve chamber 24 (see FIG. 2).

The valve element 30 is maintained in position and sealing engaged about its upper end with the counterbore 36. It is held in this position by a bonnet element 38 that is threaded to the upper end of the vertical section of body 12 and, in a manner subsequently to be described, clamps axially downward on the upper edge of valve element 30.

The valve element 30 is joined to an operating stem element 40 (see FIG. 4) that extends outwardly of the valve body through a central opening in the bonnet 38. As shown, the lower end of stem 40 has a spaced pair of flanges 42 and 44 that define a circumferential groove 46. The lower end of the stem is thus adapted to be tightly received and resiliently gripped in the interior lower end of the valve element 30. Note that the valve element 30 includes an inwardly extending flange portion 48 to thereby define a closed lower end 50 that encompasses the flange 44 to provide a connection between the stem and cup when the stem is forced into position in the valve element.

Positioned about the stem 40 is a compression coil spring 52 that has a reduced diameter lower end 54 that rests on the upper surface of flange 42. The spring 52 thus maintains the stem 40 and the valve element 30 continually biased toward a closed position as shown in FIG. 2.

The operating stem and valve element are moved between the first lower closed position and a second upper open position by the previously-mentioned cam actuator assembly 16. Although the assembly 16 could vary substantially, from what is shown, the subject assembly is a known form of safety handle which is arranged to prevent movement of the valve stem in a vertically upward direction until the user has manually moved the handle to an operating position, at which time it can be rotated to move the stem open. In particular, and as best understood by reference to FIGS. 2, 2a, and 4, the assembly 16 includes a two-part, manually operable handle including a first lever-like component 60 that has a pair of laterally spaced, downwardly extending leg elements 61a and 62a that join to a radially extending lever body 64. The legs 61a, 62a each include inwardly extending, short pivot pin portions 66 that are arranged to join to slots or grooves 71 formed inwardly from opposite sides of the upper end of stem 40 (see FIG. 4).

Slidably received on the pivoted lever body 64 is a cam actuator or handle element 68. The cam actuator or handle element 68 is linearly axially slidable on the lever 64 and is retained thereon by side flanges that extend down on laterally opposite sides of the end portion 69. Also, a transverse retainer bar 70 extends between opposite sides 72 and 74 of the cam actuator element 68. Sides 72 and 74 further define a pair of spaced cam surfaces 76. The operation of cam surfaces 76 will subsequently be described. However, for the present, it should be noted that the cam actuator element 68 is normally maintained biased to the left as shown in FIG. 2 by a compression spring 78 suitably retained in position between an end wall on cam actuator element 68 and the outer end of lever portion 64. Outward movement of the cam actuator element 68 beyond the solid line position shown in FIG. 2 is prevented by laterally extending end shoulders 80 carried on the lever 64 and engaging suitable stop surfaces on the cam actuator element 68.

With the cam actuator element 68 in the outwardly biased position shown in FIG. 2, downward pivotal movement of the actuator about the upper end of the stem 40 results in engagement of the lower corner of the cam elements 76 with the side of the body 30. No upward force can be placed on the stem by this engagement since the forces are generally acting radially of the stem. However, when the cam actuator element 68 is moved radially inward to the dotted line position of FIG. 2 by compression forces on the outer end and thereafter pivoted in a counterclockwise direction as viewed in FIG. 2, the cam surfaces 76 are in position to engage with the top of the bonnet 38 and cause an upwardly directed force to be applied to the stem to pull the valve element away from the seat and open the valve. Upon release of the actuator, the compression spring 52 forces the valve element against the seat and causes the valve to close. The spring 78 moves the cam actuator element 68 back to the solid line position of FIG. 2. Thus, as can be seen, the valve is normally moved to an open position only by a combination of movements which normally could never result merely by inadvertent contact with the handle and cam actuator assembly 16. That is, the handle must be compressed into the dotted line position and pivoted in a counterclockwise direction before opening can take place.

In addition to the above, the subject invention includes means to prevent any lateral tilting of the stem in directions lying in planes parallel to the pivot axis between the stem 40 and the cam actuator 16 as defined by the pins 66. The means to prevent this tilting in the subject invention comprise spaced parallel walls 90, 92 which define guide surfaces that are parallel to the outer surfaces of the legs 61a and 62a (see FIG. 3). The walls 90, 92 extend upwardly above the bonnet and engage legs 61a and 62a in close sliding guiding relationship.

Although it is of course possible for the walls 90, 92 to be an integral part of the bonnet member 38, in the subject embodiment, they are formed as a portion of an insert member 94 that is positioned between the bonnet and the upper end of the vertical portion of valve body 12. The insert member 94 is best illustrated in FIGS. 4 and 5. As shown therein, it includes a circular base portion 96 having an outwardly extending flange 98. The flange 98 is sized so as to extend under the radially inwardly extending flange 38a on the bonnet 38. Suitable snap tabs 100 are located above the flange 98 a short distance substantially equal to the thickness of bonnet flange 38a. The insert member can then be inserted into position in the bonnet member 38 by being forced upwardly therein until the tabs 100 latch with the top surface of the bonnet. The wall portions 90, 92 are molded integrally with the circular lower wall and are also connected by an integral end wall 102 which gives them lateral rigidity. Wall 102 also provides a vertical guide surface that prevents tilting of the stem in a direction toward wall 102. A suitable tapered brace portion 104 is also connected between the circular bottom 96 and the end wall 102. The circular bottom is further provided with a central opening 106 that closely engages and guides the stem 40.

The arrangement described with respect to the insert member 94 constrains the cam actuator assembly 16 for the desired strictly vertical and rotary movement because of the guide surfaces provided by the walls 90 and 92. Thus, forces acting laterally against the handle in directions parallel to the axis defined by pins 66 cannot cause any inadvertent crack opening which might result from such lateral tilting even though the cam surfaces 76 have not been moved inwardly. Likewise, forces acting perpendicular to back wall 102 cannot, by themselves, produce opening.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A faucet for controlling the dispensing of liquids comprising:
   a) a valve body having a valve chamber with an inlet and an outlet;
   b) a valve element in the valve chamber movable from a first to a second position for permitting flow between the inlet and the outlet;
   c) an operating stem extending from the valve element to a position exteriorly of the body;
   d) a bonnet connected to the body and surrounding the stem which extend therethrough;
   e) an actuator assembly joined to the stem and including a lever element pivotally movable about a pivot axis perpendicular to the stem, said actuator assembly further including a cam actuator mounted on the lever for selective linear movement thereon from an outwardly biased inoperative first position to an inward operative position wherein said selective linear movement is initiated first inward between guide means above the bonnet causing the cam actuator to slide along the lever and then allowing pivotal movement of the lever element and the cam actuator together as a single unit to produce movement of the valve element from the first to the second position; and,
   f) an insert member captured between the bonnet and the body and including wall portions extending outwardly through the bonnet and defining said guide means, said wall portions having surfaces closely adjacent the stem and the cam actuator in planes perpendicular to the said pivot axis to prevent tilting of the stem and the cam actuator in planes parallel to the said pivot axis.

2. A faucet as defined in claim 1 wherein the bonnet is threadedly connected to the body and includes a radially directed flange that engages over the insert and clamps it to the body.

3. A faucet as defined in claim 1 wherein the guide surfaces defined by the wall portions include a pair of spaced parallel planar guide surfaces located on opposite sides of the stem.

4. A faucet as defined in claim 3 wherein the spaced parallel planar guide surfaces are perpendicular to the pivot axis.

5. A faucet as defined in claim 2 wherein the insert is joined to the bonnet by tab members that permit rotation of the bonnet relative to the insert.

6. A faucet as defined in claim 1 wherein the cam actuator includes a cam element manually movable between the inoperative position and the operative position.

7. A faucet as defined in claim 6 wherein the cam actuator is biased by a coil spring positioned to act in a direction perpendicular to the pivot axis.

8. A faucet for controlling the dispensing of liquids comprising:
   a) a valve body having a valve chamber with an inlet and an outlet;
   b) a valve element in the valve chamber movable from a first and to a second position for permitting flow between the inlet and the outlet;
   c) an operating stem extending from the valve element to a position exteriorly of the body;
   d) a bonnet connected to the body and surrounding the stem which extend therethrough;
   e) actuator assembly joined to the stem and including a lever element pivotally movable about a pivot axis perpendicular to the stem, said actuator assembly further including a cam actuator mounted of the lever for selective linear movement thereon from an outwardly biased inoperative first position to an inward operative position wherein said selective linear movement is initiated first inward between guide means above the bonnet causing the cam actuator to slide along the lever and then allowing pivotal movement of the lever element and the cam actuator together as a single unit to produce movement of the valve element from the first to the second position; and,
   f) wall forming portions extending outwardly of the bonnet and defining said guide means, said wall forming portions including guide surfaces closely adjacent the stem and the cam actuator in planes perpendicular to the said pivot axis to prevent tilting of the stem and the cam actuator in planes parallel to the said pivot axis.

9. The faucet as defined in claim 8 wherein the wall forming portions define spaced planar guide surfaces.

10. The faucet as defined in claim 9 wherein the wall forming portions are carried on an insert received in the bonnet.

11. The faucet as defined in claim 9 including spring biasing means for biasing the cam actuator to the outward inoperative first position where pivotal movement to move the valve to one of the first and second positions is prevented.

* * * * *